UNITED STATES PATENT OFFICE.

JACOB MEYER, OF FRANKFORT-ON-THE-MAIN, ASSIGNOR TO THE FARBEN-FABRIKEN, VORMALS FR. BAYER & CO., OF ELBERFELD, GERMANY.

TANNIN COMPOUND.

SPECIFICATION forming part of Letters Patent No. 533,718, dated February 5, 1895.

Application filed September 11, 1894. Serial No. 522,731. (Specimens.)

*To all whom it may concern:*

Be it known that I, JACOB MEYER, chemist and doctor of philosophy, a subject of the Emperor of Germany, residing at Frankfort-on-the-Main, Germany, have invented a new and useful Improvement in the Manufacture of a Pharmaceutical Product; and I do hereby declare the following to be a clear and exact description of my invention.

My invention relates to the production of a valuable pharmaceutical product by treating gallic acid anhydrides, as for instance, the well known "tannin" with organic acid anhydrides, especially acetic acid anhydride, by means whereof a mixture of monoacetylated gallic acid anhydrides and diacetylated gallic acid anhydrides are formed. These products, when used as an internal medicine, do not affect the stomach and only act when they come into the intestines, while "tannin" itself, as known, is attended with ill effects, as it is soluble and by its tanning action affects the stomach in a high degree.

The aforesaid new products are of special value when used in chronic catarrhal affections of the intestines. They may be given in daily doses of from two to five grains. It is probable that this remedy passes the stomach without any decomposition, and it is only dissolved by the alkaline liquid of the intestines, tannin being again formed.

In carrying out my invention practically, I can proceed as follows: One part, by weight, of dry tannin is mixed with one-half part, by weight, of glacial acetic acid and one part, by weight, of acetic acid anhydride. This mixture is heated at about 130° to 140° centigrade, the tannin being gradually dissolved, and after from six to seven hours the dark mass so formed is poured in a thin stream under continuous stirring into water, a resinous mass being thus separated. This mass is stirred with water during a prolonged period, profitably using fresh water for every single operation. The resinous mass is by this treatment converted into a light-yellow powder, which is filtered off and while on the filter is washed with water until the washings show no color.

The product so formed represents a mixture containing the monoaceto compound together with the diaceto compound. It is amorphous, soluble in alcohol, insoluble in water and dilute acids, soluble in cold dilute alkalies and can be precipitated in an unaltered state by acidulating its cold alkaline solutions. On heating with alkalies it undergoes decomposition.

The proportion of the diaceto compound contained in the above described product is increased by using a greater quantity of acetic anhydride.

The same product as said before can be obtained if the acetic acid anhydride is replaced by acetyl chloride and other analogous products with similar physiological properties result if instead of "tannin" other gallic acid anhydrides or gallic acid and instead of acetic acid anhydride other anhydrides or acid chlorides (such as propionic acid anhydride or propionic acid chloride and so on) are employed in the above described process.

Having now described my invention and in what manner the same is to be performed, what I claim as new, and desire to secure by Letters Patent, is—

1. The process for the production of pharmaceutical products, consisting in heating tannin with a mixture of glacial acetic acid and acetic acid anhydride, substantially as described.

2. As a new article of manufacture, the pharmaceutical product consisting of a mixture of mono- and diacetyl tannin and which forms an amorphous light yellow powder soluble in alcohol, insoluble in water and dilute acid, soluble in cold dilute alkali, and which is precipitated from its alkaline solution by means of acids in an unaltered state, substantially as described.

In testimony whereof I have signed my name in the presence of two subscribing witnesses.

JACOB MEYER.

Witnesses:
 JEAN GRUND,
 FRANK H. MASON.